United States Patent Office
3,165,544
Patented Jan. 12, 1965

3,165,544
CHLOROTHIOLFORMATES AND PREPARATION THEREOF
Harry Tilles, El Cerrito, Calif., assignor to Stauffer Chemical Company, a corporation of Delaware
No Drawing. Filed Sept. 6, 1960, Ser. No. 53,924
13 Claims. (Cl. 260—455)

This invention relates in general to a method for the preparation of chlorothiolformates and to the use thereof.

Various methods are known for the preparation of lower alkyl ($C_1$-$C_4$) dodecyl and phenyl chlorothiolformates but each of these afford only relatively low yields and impure products. Further, certain known methods require a number of days for completion, require refrigerated cooling and large volumes of reaction mixture, do not afford uniform results (exhibiting sensitivity to reaction conditions) or require the preparation of lead mercaptides.

It is therefore an object of this invention to provide a method for the production of alkyl, lower cycloakyl, alkenyl, aryl, aralkyl and alkaryl chlorothiolformates and substitution products thereof by a straightforward method which yields a number of novel compounds.

It is a further object of this invention to provide a method for the production of the aforementioned chlorothiolformates by a method which results in near quantitative yields. Still another object of this invention is to provide compounds for use in the control of nematodes and fungi and methods for using these compounds against such organisms.

Generally, this invention relates to a process wherein a mixture of the appropriate mercaptan and phosgene is brought into intimate contact with activated carbon which acts as a selective catalyst for the reaction.

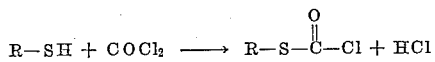

where R is alkyl, cycloalkyl, lower alkenyl, aryl, alkaryl, aralkyl, haloaryl, haloarylalkyl and carboalkoxyalkyl.

Similarly, phosgene and a dithiol are contacted in the presence of finely pulverized activated carbon which acts as a selective catalyst for the reaction

where $n$ is 3–5.

The process can be carried out continuously by passing the mercaptan or dithiol and phosgene mixture through a bed of the carbon catalyst in a tubular reactor.

The selectivity of the catalyst is rather surprising. A by-product which is always formed when the known art procedures are used is the dithiolcarbonate which can be formed by either of two paths:

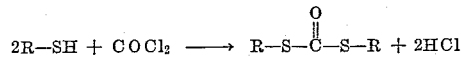

or

Similar equations may be written for the reaction involving the dithiol. As can be seen by the two above equations, an excess of mercaptan will favor the formation of dithiolcarbonate. It has been found that dithiolcarbonate is formed in considerable amounts using various of the known procedures, even when large excesses of phosgene are employed.

It is, therefore, the more surprising that we have detected only traces of dithiolcarbonate in our methyl chlorothiolformate and ethyl chlorothiolformate, although in some of our reactions, large excesses of mercaptan were present. This indicates that the carbon catalyst catalyzes the reaction of the phosgene and mercaptan to the chlorothiolformate but does not carry the reaction further.

Reaction conditions will vary depending upon the particular mercaptan used. It has been observed that the rate of formation of n-octyl chlorothiolformate is slower than the rate of formation of methyl and ethyl chlorothiolformates. Hence, a longer catalyst bed will be required to effect conversion of the octyl mercaptan.

The carbon may be activated in any of the conventional fashions as by heating with chlorine, steam, carbon dioxide or sulfuric acid.

It is also advised that the reaction temperatures be maintained as low as possible, consonant with reasonable reaction rates, since, at high temperatures, the disulfide begins to form in significant amounts. For example, for the methyl analogue, the maximum reaction temperature whereby to obtain a minimum of the disulfide is about 70° C. and for the ethyl analogue, this maximum lies within the range of 75°–140° C.

As is known, the mercaptans exhibit varying reactivities and have varying decomposition temperatures and these must be taken into account in selecting optimum reaction temperatures.

In carrying out the process on a batch basis, the activated carbon, finely pulverized, is charged to the reactor with the mercaptan or dithiol. About 5–50% excess phosgene is then added, and cooling is applied if the reaction is strongly exothermic. The mixture is then stirred for several hours, the excess phosgene stripped, the carbon filtered off, and the product worked up.

This activated carbon process has been found to be applicable for the preparation of unbranched lower and higher n-alkyl chlorothiolformates such as methyl, ethyl, n-propyl, n-butyl, n-amyl, n-hexyl, n-heptyl, n-octyl, n-decyl, n-dodecyl and n-tetradecyl chlorothiolformates; branched lower and higher n-alkyl chlorothiolformates such as isobutyl and 2-ethylhexyl chlorothiolformates; lower sec.-alkyl chlorothiolformates such as isopropyl and sec.-butyl chlorothiolformates; aryl chlorothiolformates, such as phenyl, p-chlorophenyl, 2-naphthyl, o-tolyl, m-tolyl chlorothiolformates; aralkyl chlorothiolformates such as benzyl; p-chlorobenzyl and 2-phenylethyl chlorothiolformate; cycloaliphatic chlorothiolformates such as cyclohexyl chlorothiolformate; alkylene bis(chlorothiolformates) such as trimethylene, tetramethylene and pentamethylene chlorothiolformates; alkenyl chlorothiolformates such as allyl chlorothiolformate and carboalkoxyalkyl chlorothiolformates such as carboethoxymethyl chlorothiolformate.

Although with liquid mercaptans, it is preferable to use no solvent, a solvent can be used if it is desired, for example, to dissolve solid mercaptans.

It is unnecessary to use an excess of phosgene if it is more convenient to use an excess of mercaptan or dithiol. A satisfactory product can be obtained either way.

Examples are set forth below for purposes of illustration but these are not to be construed as imposing limitations on the scope of the invention other than as set forth in the appended claims.

*Example 1.—Methyl Chlorothiolformate*

A mixture of methyl mercaptan and phosgene was passed through a tubular glass reactor, 1″ diameter x 24″ long, containing 255 cc. (144 g.) of activated carbon, 4 x 10 mesh, at a rate of 24 g. (0.50 mole) per hour methyl mercaptan and 54.5 g. (0.55 mole) per hour phosgene for an interval of 65.8 hours. The reaction was cooled by a continuous flow of tap water through an external water jacket. The temperature of the reaction was 45° C. at a point ½" below the top of the catalyst bed, 25° C. at a point 3½" below the top of the catalyst bed, 16° C. at 6½" below the top and 13.5° C. at 9½" from the top. The colorless liquid product was collected in a receiver at the bottom of the reactor. After the reaction was shut down, the product was transferred to a 5 l. flask and the volatile impurities were removed by bringing the mixture to reflux under water pump vacuum for 170 minutes, the pot temperature rising from 18–26° C. Ice water was circulated through the condenser and a Dry Ice trap was inserted in series between the condenser and vacuum pump to recover any product that was stripped off. There was obtained as a residue 3746 g. (103% yield) of methyl chlorothiolformate, $n_D^{30}$ 1.4839, $d_4^{30}$ 1.2761. Within experimental error, this is essentially a quantitative yield. Gas-liquid chromatography shows this product to have a purity of 99.5+%.

*Analysis.*—Calcd. for $C_2H_3ClOS$: Cl, 32.07; S, 29.00. Found: Cl, 31.57; S, 28.59.

Example 2.—Ethyl Chlorothiolformate

A mixture of ethyl mercaptan and phosgene was passed through a tubular glass reactor, 1" diameter x 18" long, containing 150 cc. (61.9 g.) of activated carbon, 20 x 50 mesh, at a rate of 31 g. (0.50 mole) per hour ethyl mercaptan and 54.5 g. (0.55 per mole) per hour phosgene for an interval of 1½ hours. The reaction was cooled by a continuous flow of tap water through an external water jacket. The temperature of the reaction was 43.5–46.5° C. at a point ½" below the top of the catalyst bed and 23.0–24.0° C. at a point 3½" below the top of the catalyst bed. The colorless liquid product was collected in a receiver at the bottom of the reactor. After the reaction was shut down, the product was transferred to a 500 cc. flask and the volatile impurities were removed by bringing the mixture to reflux under water pump vacuum for 32 minutes, the pot temperature rising from 25–43.5° C. Ice water was circulated through the condenser and a Dry Ice trap was inserted in series between the condenser and vacuum pump to recover any product that was stripped off with the uncondensables. There was obtained as a residue 171 g. (91.5% yield) of ethyl chlorothiolformate, $n_D^{30}$ 1.4777. Gas-liquid chromatography shows this product to have a purity of 98.9%.

*Analysis.*—Calcd. for $C_3H_5ClOS$: Cl, 28.46; S, 25.74. Found: Cl, 27.96; S, 25.87.

Example 3.—n-Propyl Chlorothiolformate

A 4 neck 1 l. flask was provided with stirrer, thermometer, Dry Ice condenser and gas inlet tube. 20 g. of finely pulverized activated carbon and 228 g. (3.00 moles) of n-propyl mercaptan were charged to the flask. 312 g. (3.15 moles) of phosgene was then added over an internal of 31 minutes, maintaining the temperature between 20–32° C. The mixture was then allowed to stir for 170 minutes at 19–26° C. Most of the excess phosgene was then stripped out wtih air and the mixture was then filtered with Dicalite Filter Aid. The filtrate was then transferred to a 1 l. flask and the volatile impurities were removed by refluxing under water pump vacuum for 20 minutes, the pot temperature rising from 20–44° C. Tap water was circulated through the condenser and a Dry Ice trap was connected in series between the condenser and vacuum pump to recover any stripped-off product. There was obtained as a residue 397 g. (94.5% yield) of n-propyl chlorothiolformate, $n_D^{30}$ 1.4753, $d_4^{30}$ 1.1341. Gas-liquid chromatography shows this product to have a purity of 98.9%.

*Analysis.*—Calcd. for $C_4H_7ClOS$: Cl, 25.58; S, 23.13. Found: Cl, 25.31; S, 23.36.

Example 4.—i-Propyl Chlorothiolformate

A 4 neck 500 cc. flask was provided with stirrer, thermometer, Dry Ice condenser and gas inlet tube. 20 g. of finely pulverized activated carbon and 76 g. (1.00 mole) of i-propyl mercaptan were charged to the flask. 129 g. (1.30 moles) of phosgene was then added over an interval of 21 minutes, maintaining the temperature between 13 and 27° C. The mixture was then allowed to stir for 4½ hours at 11.5–23° C. The excess phosgene was then stripped off with air and the mixture was filtered with Dicalite Filter Aid. The filter cake was washed with 4–25 cc. portions of n-pentane. The combined filtrate was then refluxed under water-pump vacuum to remove volatile impurities and n-pentane. A Dry Ice trap was connected in series with the condenser and water pump to recover any product that was stripped off. There was obtained as a residue 123.1 g. (89.0% yield) of i-propyl chlorothiolformate, $n_D^{30}$ 1.4704. Gas-liquid chromatography shows this product to have a purity of 98.0%.

*Analysis.*—Calcd. for $C_5H_9ClOS$: Cl, 23.23; S, 21.01. Found: Cl, 25.00; S, 22.59.

Example 5.—n-Butyl Chlorothiolformate

Into the same apparatus used in Example 3 was charged 30 g. of finely pulverized activated carbon and 270 g. (3.00 moles) of n-butyl mercaptan. 312 g. (3.15 moles) of phosgene was then added over an interval of 32 minutes, maintaining the temperature between 4–22° C. The mixture was then allowed to stir for 4 hours 23 minutes at 22–27° C. The product was then worked up in a similar manner to Example 3. There was obtained as a residue 409 g. (89.5% yield) of n-butyl chlorothiolformate, $n_D^{30}$ 1.4736, $d_4^{30}$ 1.0980. Gas-liquid chromatography shows this product to have a purity of 98.5%.

*Analysis.*—Calcd. for $C_5H_9ClOS$: Cl, 23.23; S, 21.01 Found: Cl, 22.99; S, 21.03.

Example 6.—Sec-Butyl Chlorothiolformate

Into the same apparatus used in Example 4 was charged 20 g. of finely pulverized activated carbon and 90 g. (1.00 mole) of sec-butyl mercaptan. 119 g. (1.20 moles) of phosgene was then added over an interval of 10 minutes, maintaining the temperature between 19.5–33° C. The mixture was then allowed to stir for 5 hours at 15.5–24.5° C. The excess phosgene was then stripped off with air and the mixture was filtered with Dicalite Filter Aid. The filter cake was washed with 4–25 cc. portions of n-pentane and the combined filtrate was concentrated on the steam bath. The residual liquid was then fractionally distilled under reduced pressure. There was obtained 117 g. (76.6% yield) of sec-butyl chlorothiolformate, B.P. (60 mm.) 89.5–90.0° C., $n_D^{30}$ 1.4726.

*Analysis.*—Calcd. for $C_5H_9ClOS$: Cl, 23.23; S, 21.01. Found: Cl, 23.02; S, 21.45.

Example 7.—i-Butyl Chlorothiolformate

A 4 neck 100 cc. flask was provided with stirrer, thermometer, Dry Ice condenser and gas inlet tube. 5 g. of finely pulverized activated carbon and 27.0 g. (0.30 mole) of isobutyl mercaptan were charged to the flask. 45 g. (0.45 mole) of phosgene was then added over an interval of 17 minutes, maintaining the temperature between 14–27° C. The mixture was then allowed to stir for 4 hours 51 minutes at 14–26° C. The excess phosgene was then removed by stripping with air and the mixture was then filtered with Dicalite Filter Aid. The filter cake was washed with 4–25 cc. portions of n-pentane and the combined filtrate was concentrated on the steam bath. The residual liquid was fractionally distilled under reduced pressure. There was obtained 32 g. (69.8% yield) of isobutyl chlorothiolformate, B.P. (10 mm.) 50.0–51.5° C., $n_D^{30}$ 1.4720.

*Analysis.*—Calcd. for $C_5H_9ClOS$: Cl, 23.23; S, 21.01. Found: Cl, 23.3; S, 21.0.

Example 8.—n-Amyl Chlorothiolformate

Into the same apparatus used in Example 4 was charged 20 g. of finely pulverized activated carbon and 104 g. (1.00 mole) of n-amyl mercaptan. 119 g. (1.20 moles)

of phosgene was then added over an interval of 10 minutes, maintaining the temperature between 7–20.5° C. The mixture was then allowed to stir for 2 hours 47 minutes at 14.5–29.0° C. The mixture was then worked up in the same manner as in Example 4. There was obtained as a residue 149.4 g. (89.7% yield) of n-amyl chlorothiolformate, $n_D^{30}$ 1.4730 ($d_4^{30}$ 1.0697). Gas-liquid chromatography shows this product to have a purity of 97.4%.

*Analysis.*—Calcd. for $C_6H_{11}ClOS$: Cl, 21.27; S, 19.24. Found: Cl, 21.31; S, 19.51.

Example 9.—n-Hexyl Chlorothiolformate

Into the same apparatus used in Example 4 was charged 20 g. of finely pulverized activated carbon and 118 g. (1.00 mole) of n-hexyl mercaptan. 119 g. (1.20 moles) of phosgene was then added over an interval of 17 minutes, maintaining the temperature between 13–19.5° C. The mixture was then allowed to stir for 5 hours 11 minutes at 18–27.5° C. The mixture was then worked up in the same manner as in Example 6. There was obtained 167.5 g. (92.8% yield) of n-hexyl chlorothiolformate, B.P. (10 mm.) 93–96° C., $n_D^{30}$ 1.4720, $d_4^{30}$ 1.0483.

*Analysis.*—Calcd. for $C_7H_{13}ClOS$: Cl, 19.62; S, 17.74. Found: Cl, 19.9; S, 18.0.

Example 10.—n-Heptyl Chlorothiolformate

Into the same apparatus used in Example 4 was charged 20 g. of finely pulverized activated carbon and 132 g. (1.00 mole) of n-heptyl mercaptan. 119 g. (1.20 moles) of phosgene was then added over an interval of 12 minutes, maintaining the temperature between 16–22° C. The mixture was then allowed to stir for 3 hours and 8 minutes at 17.5–27° C. The mixture was then worked up in the same manner as is Example 6. There was obtained 152 g. (78.3% yield) of n-heptyl chlorothiolformate, B.P. (10 mm.) 110–112° C., $n_D^{30}$ 1.4718, $d_4^{30}$ 1.0278.

*Analysis.*—Calcd. for $C_8H_{15}ClOS$: Cl, 18.21; S, 16.47. Found: Cl, 18.2; S, 16.3.

Example 11a.—n-Octyl Chlorothiolformate

Into the same apparatus used in Example 4 was charged 20 g. of finely pulverized activated carbon and 146 g. (1.00 mole) of n-octyl mercaptan. 119 g. (1.20 moles) of phosgene was then added over an interval of 17 minutes, maintaining the temperature between 9.5–18.5° C. The mixture was then allowed to stir for 5 hours 11 minutes at 17.5–28.5° C. The mixture was then worked up in the same manner as in Example 6. There was obtained 181.5 g. (87.0% yield) of n-octyl chlorothiolformate, B.P. (10 mm.) 124.0–124.5° C., $n_D^{30}$ 1.4713, $d_4^{30}$ 1.0148.

*Analysis.*—Calcd. for $C_9H_{17}ClOS$: Cl, 16.98; S, 15.36. Found: Cl, 17.1; S, 15.7.

Example 11b.—n-Octyl Chlorothiolformate

Into the same continuous reactor described in Example 2 and containing the same type and amount of catalyst was fed 73 g. (0.50 mole) per hour n-octyl mercaptan and 60 g. (0.60 mole) per hour phosgene for an interval of 2 hours. The reaction was cooled by a continuous flow of tap water through an external water jacket. The temperature of the reaction was 47–43° C. at a point ½″ below the top of the catalyst bed and 23–24.5° C. at a point 3½″ below the top of the catalyst bed. The colorless liquid product was collected in a receiver at the bottom of the reactor. After the reaction was shut down, the product was heated on the steam bath with air to remove most of the volatiles and the residual liquid was then fractionally distilled under reduced pressure. There was obtained 189 g. (90.4%) yield of n-octyl chlorothiolformate, B.P. (10 mm.) 124.0–124.1°, $n_D^{30}$, 1.4717.

*Analysis.*—Calcd. for $C_9H_{17}ClOS$: Cl, 16.98; S, 15.36. Found: Cl, 17.02; S, 15.26.

Example 12.—n-Decyl Chlorothiolformate

Into the same apparatus used in Example 4 was charged 20 g. of finely pulverized activated carbon and 176 g. (1.00 mole) of n-decyl mercaptan. 129 g. (1.30 moles) of phosgene was then added over an interval of 18 minutes, maintaining the temperature between 11–28° C. The mixture was then allowed to stir for 3 hours 24 minutes at 21–28° C. The mixture was then filtered with Dicalite Filter Aid and the filter cake was washed with 4–25 cc. portions of n-pentane. The combined filtrate was concentrated on the steam bath and then transferred to a 1 l. round bottomed flask. This flask was attached to a Rinco Rotating Evaporator and heated with three infra-red lamps at 150 microns for a short while to remove any volatiles. There remained behind as a liquid residue, 210.7 g. (89.1% yield) of n-decyl chlorothiolformate, $n_D^{30}$ 1.4708, $d_4^{30}$ 0.9862.

*Analysis.*—Calcd. for $C_{11}H_{21}ClOS$: Cl, 14.97; S, 13.54. Found: Cl, 14.70; S, 13.29.

Example 13.—n-Dodecyl Chlorothiolformate

Into the same apparatus used in Example 4 was charged 20 g. of finely pulverized activated carbon and 104 g. (0.51 mole) of n-dodecyl mercaptan. 61 g. (0.61 mole) of phosgene was then added over an interval of 15 minutes, maintaining the temperature at 8–31° C. The mixture was then allowed to stir for 2 hrs. 48 minutes at 21–27.5° C. It was then worked up in the same manner as in Example 12. There remained behind as a liquid residue 129 g. (95.5% yield) of n-dodecyl chlorothiolformate, $n_D^{30}$ 1.4700.

*Analysis.*—Calcd. for $C_{13}H_{25}ClOS$: Cl, 13.39; S, 12.11. Found: Cl, 13.47; S, 12.00.

Example 14.—n-Tetradecyl Chlorothiolformate

Into the same apparatus used in Example 7 was charged 5 g. of finely pulverized activated carbon and 46.1 g. (0.20 mole) of n-tetradecyl mercaptan. 24 g. (0.24 mole) of phosgene was then added over an interval of 42 minutes, maintaining the temperature at 25–54° C. The mixture was then allowed to stir for 4 hours 26 minutes at 25—56° C. It was then worked up in the same manner as in Example 12. There remained behind as a liquid residue 53.1 g. (90.5% yield) of n-tetradecyl chlorothiolformate, $n_D^{30}$ 1.4703.

*Analysis.*—Calcd. for $C_{15}H_{29}ClOS$: Cl, 12.10; S, 10.95. Found: Cl, 11.10; S, 10.73.

I.R. spectra confirm the structure of this product.

Example 15.—Phenyl Chlorothiolformate

Into the same apparatus used in Example 4 was charged 30 g. of finely pulverized activated carbon and 110 g. (1.00 mole) of thiophenol. 119 g. (1.20 moles) of phosgene was then added over an interval of 7 minutes, maintaining the temperature at 5–19° C. The mixture was then allowed to stir for 3 hours 17 minutes at 15.5–50.0° C. The mixture was then filtered with Dicalite Filter Aid and the cake was washed with 4–25 cc. portions of n-pentane. The filtrate was diluted with 200 cc. of n-pentane and washed with 3–100 cc. portions of 10% aqueous sodium hydroxide solution. The water and solvent was then removed by heating under reduced pressure and the residual liquid was then fractionally distilled. There was obtained 132 g. (76.5% yield) of phenyl chlorothiolformate, B.P. (10 mm.) 99.5—100.5 C., $n_D^{30}$ 1.5787.

*Analysis.*—Calcd. for $C_7H_5ClOS$: Cl, 20.55; S, 18.58. Found: Cl, 20.6; S, 18.6.

Example 16.—o-Tolyl Chlorothiolformate

Into the same apparatus used in Example 7 was charged 5 g. of finely puverized activated carbon, 17.3 g. (0.14 mole) of o-toluenethiol and 100 cc. of n-pentane solvent.

21 g. (0.21 mole) of phosgene was then added over an interval of 7 minutes, maintaining the temperature at 17.5–27.0° C. The mixture was then allowed to stir for 6 hours 20 minutes at 27–35° C. It was then worked up in the same manner as in Example 7. There was obtained 18.4 g. (70.5% yield) of o-tolyl chlorothiolformate, B.P. (10 mm.) 111–112° C., $n_D^{30}$ 1.5750.

Analysis.—Calcd. for $C_8H_7ClOS$: Cl, 18.99; S, 17.18. Found: Cl, 18.91; S, 17.13.

Example 17.—m-Tolyl Chlorothiolformate

Into the same apparatus used in Example 7 was charged 5 g. of finely pulverized activated carbon and 37.2 g. (0.30 mole) of m-toluenethiol. 39 g. (0.39 mole) of phosgene was then added over an interval of 45 minutes, maintaining the temperature at 16–40.5° C. The mixture was then allowed to stir for 2 hours 34 minutes at 16–30° C. It was then worked up in the same manner as in Example 7. There was obtained 31.2 g. (55.8% yield) of m-tolyl chlorothiolformate, B.P. (10 mm.) 115.5–116.0° C., $n_D^{30}$ 1.5701.

Analysis.—Calcd. for $C_8H_7ClOS$: Cl, 18.99; S, 17.18. Found: Cl, 19.05; S, 17.20.

Example 18.—p-Tolyl Chlorothiolformate

Into the same apparatus used in Example 7 was charged 5 g. of finely pulverized activated carbon, 37.2 g. (0.30 mole) of p-toluenethiol and 150 cc. of n-pentane solvent. 45 g. (0.45 mole) of phosgene was then added over an interval of 6 minutes, maintaining the temperature at 19.5–29.5° C. The mixture was then allowed to stir for 1 hour 24 minutes at 20–27° C. It was then worked up in the same manner as in Example 7. There was obtained 12.2 g. of unreacted p-toluenethiol and 25.5 g. (67.8% yield based on recovered p-toluenethiol) of p-tolyl chlorothiolformate, B.P. (10 mm.) 114.0–117.5° C. $n_D^{30}$ 1.5725.

Analysis.—Calcd. for $C_8H_7ClOS$: Cl, 18.99; S, 17.18. Found: Cl, 19.00; S, 16.81.

Example 19.—p-Chlorophenyl Chlorothiolformate

Into the same apparatus used in Example 4 was charged 20 g. of finely pulverized activated carbon and 144.5 g. (1.00 mole) of p-chlorothiophenol. The p-chlorothiophenol was then heated to 60° C. until it was all melted and then 119 g. (1.20 moles) of phosgene was added over an interval of 1 hour 26 minutes at 38–56° C. The mixture was then allowed to stir for 3 hours and 34 minutes at 38–61° C. It was then worked up in the same manner as in Example 6. There was obtained 179 g. (86.5% yield) of p-chlorophenyl chlorothiolformate, B.P. (10 mm.) 126.0–126.5° C., $n_D^{30}$ 1.5961.

Analysis.—Calcd. for $C_7H_4Cl_2OS$: Cl, 34.24; S, 15.48. Found: Cl, 34.25; S, 15.35.

Example 20.—2-Naphthyl Chlorothiolformate

Into the same apparatus used in Example 7 was charged 5 g. of finely pulverized activated carbon, 24 g. (0.15 mole) of 2-naphthalenethiol and 100 cc. of tetrahydrofuran solvent. 19 g. (0.20 mole) of phosgene was then added over an interval of 7 minutes at 19.5–39.5° C. The mixture was then allowed to stir for 1 hour 54 minutes at 36.5–59.5° C. It was then filtered with Dicalite Filter Aid and the filtrate was concentrated on the steam bath. The crude solid product was dissolved in 500 cc. of n-pentane and washed with 2–100 cc. portions of 10% aqueous sodium hydroxide solution. A considerable amount of solid formed, which was insoluble in both pentane and water. It appeared as if the caustic wash caused decomposition. The mixture was then filtered and the pentane filtrate was concentrated on the steam bath. There was obtained 12.2 g. (36.6% yield) of 2-napththyl chlorothiolformate, M.P. 49–51° C.

Analysis.—Calcd. for $C_9H_7ClOS$: Cl, 15.92; S, 14.40. Found: Cl, 15.89; S, 14.15.

Example 21.—Benzyl Chlorothiolformate

Into the same apparatus used in Example 7 was charged 5 g. of finely pulverized activated carbon and 37.2 g. (0.30 mole) of benzyl mercaptan. 45 g. (0.45 mole) of phosgene was then added over an interval of 17 minutes, maintaining the temperature at 12–25° C. The mixture was then allowed to stir for 5 hours and 54 minutes at 12–24.5° C. It was then worked up in the same manner as in Example 12. There was obtained as a liquid residue, 50.0 g. (89.4% yield) of benzyl chlorothiolformate, $n_D^{30}$ 1.5703.

Analysis.—Calcd. for $C_8H_7ClOS$: Cl, 18.99; S, 17.18. Found: Cl, 19.37; S, 16.39.

I.R. spectra confirms the structure of this product.

Example 22.—p-Chlorobenzyl Chlorothiolformate

Into the same apparatus used in Example 7 was charged 5 g. of finely pulverized activated carbon and 47.5 g. (0.30 mole) of p-chlorobenzyl mercaptan. 36 g. (0.36 mole) of phosgene was then added over an interval of 47 minutes, maintaining the temperature at 42.5–57.0° C. The mixture was then allowed to stir for 3 hours 46 minutes at 42.5–59.0° C. It was then worked up in the same manner as in Example 12. There was obtained as a liquid residue 61.2 g. (92.3% yield) of p-chlorobenzyl chlorothiolformate, $n_D^{30}$ 1.5845.

Analysis.—Calcd. for $C_8H_6Cl_2OS$: Cl, 32.07; S, 14.50. Found: Cl, 31.80; S, 14.11.

Example 23.—2-Phenylethyl Chlorothiolformate

Into the same apparatus used in Example 7 was charged 5 g. of finely pulverized activated carbon and 41.4 g. (0.30 mole) of 2-phenylethyl mercaptan. 45 g. (0.45 mole) of phosgene was then added over an interval of 25 minutes at 12–32.5° C. The mixture was then allowed to stir for 3 hours 52 minutes. It was then worked up in the same manner as Example 7. There was obtained 46.7 g. (77.5% yield) of 2-phenylethyl chlorothiolformate, B.P. (10 mm.) 135.0–135.2° C., $n_D^{30}$ 1.5590.

Analysis.—Calcd. for $C_9H_9ClOS$: Cl, 17.67; S, 15.98. Found: Cl, 17.68; S, 15.88.

Example 24.—Cyclohexyl Chlorothiolformate

Into the same apparatus used in Example 7 was charged 5 g. of finely pulverized activated carbon and 23.2 g. (0.20 mole) of cyclohexyl mercaptan. 30 g. (0.30 mole) of phosgene was then added over an interval of 12 minutes, maintaining the temperature at 12–20° C. The mixture was then allowed to stir for 3 hours 38 minutes at 16–26° C. It was then worked up in the same manner as Example 7. There was obtained 25.6 g. (71.7% yield) of cyclohexyl chlorothiolformate, B.P. (10 mm.) 96.0–97.0° C., $n_D^{30}$ 1.5109.

Analysis.—Calcd. for $C_7H_{11}ClOS$: Cl, 19.84; S, 17.94. Found: Cl, 19.84; S, 17.93.

Example 25.—Trimethylene Bis(Chlorothiolformate)

Into the same apparatus used in Example 7 was charged 5 g. of finely pulverized activated carbon and 21.6 g. (0.20 mole) of 1,3-propanedithiol. 60 g. (0.60 mole) of phosgene was then added over an interval of 36 minutes at a temperature of 8–28° C. The mixture was then allowed to stir for 4 hours 58 minutes at 8–16° C. It was then worked up in the same manner as in Example 12. There remained behind as a liquid residue 33.2 g. (71.3% yield) of trimethylene bis(chlorothiolformate), $n_D^{30}$ 1.5512.

Analysis.—Calcd. for $C_5H_6Cl_2O_2S_2$: Cl, 30.41; S, 27.50. Found: Cl, 30.41; S, 27.12.

Example 26.—Tetramethylene Bis(Chlorothiolformate)

Into the same apparatus used in Example 7 was charged 5 g. of finely pulverized activated carbon and 24.4 g. (0.20 mole) of tetramethylene dimercaptan. 60 g. (0.60 mole) of phosgene was then added over an interval of 37 minutes, maintaining the temperature at 8.5–25° C. The mixture was then allowed to stir for 4 hours 24 minutes at 8.5–13.0° C. It was then worked up in the same manner as in Example 12. There remained behind a solid residue which was triturated with 3–100 cc. portions of n-pentane and then dried. There was obtained 42.9 g. (86.9% yield) of tetramethylene bis(chlorothiolformate), M.P. 43.5–46.0° C.

*Analysis.*—Calcd. for $C_6H_8Cl_2O_2S_2$: Cl, 28.69; S, 25.94. Found: Cl, 28.6; S, 25.5.

*Example 27.—Pentamethylene Bis(Chlorothiolformate)*

Into the same apparatus used in Example 7 was charged 5 g. of finely pulverized activated carbon and 27.2 g. (0.20 mole) of 1,5-pentanedithiol. 60 g. (0.60 mole) of phosgene was then added over an interval of 14 minutes, maintaining the temperature at 14.5–27.0° C. The mixture was then allowed to stir for 5 hours 41 minutes at 14–22° C. It was then worked up in the same manner as in Example 12. There remained behind as a liquid residue, 47.7 g. (91.1% yield) of pentamethylene bis (chlorothiolformate), $n_D^{30}$ 1.5374.

*Analysis.*—Calcd. for $C_7H_{10}Cl_2O_2S_2$: Cl, 27.07; S, 24.48. Found: Cl, 27.02; S, 24.53.

*Example 28.—Allyl Chlorothiolformate*

Into the same apparatus used in Example 7 was charged 5 g. of finely pulverized activated carbon and 22.2 g. (0.30 mole) of allyl mercaptan. 45 g. (0.45 mole) of phosgene was then added over an interval of 25 minutes, maintaining the temperature at 14–26° C. The mixture was then allowed to stir for 4 hours and 46 minutes at 12.5–25.0° C. It was then worked up in the same manner as in Example 7. There was obtained 27.1 g. (66.3% yield) of allyl chlorothiolformate, B.P. (10 mm.) 60.5–61.0° C., $n_D^{30}$ 1.4976.

*Analysis.*—Calcd. for $C_4H_5ClOS$: Cl, 25.95; S, 23.47. Found: Cl, 25.84; S, 23.39.

*Example 29.—Carboethoxymethyl Chlorothiolformate*

Into the same apparatus used in Example 7 was charged 5 g. of finely pulverized activated carbon and 36 g. (0.30 mole) of ethyl mercaptoacetate. 45 g. (0.45 mole) of phosgene was then added over an interval of 19 minutes, maintaining the temperature at 15–21° C. The mixture was then allowed to stir for 3 hours 44 minutes at 15–21.5° C. It was then worked up in the same manner as in Example 7. There was obtained 17.3 g. of unreacted ethyl mercaptoacetate and 16.1 g. (56.7% yield based on recovered ethyl mercaptoacetate) of carboethoxymethyl chlorothiolformate, B.P. (10 mm.) 99.5–100.0° C., $n_D^{30}$ 1.4786.

*Analysis.*—Calcd. for $C_5H_7ClO_3S$: Cl, 19.41; S, 17.56. Found: Cl, 19.48; S, 17.4.

*Example 30.—2-Ethylhexyl Chlorothiolformate*

Into the same apparatus used in Example 7 was charged 5 g. of finely pulverized activated carbon and 43.8 g. (0.30 mole) of 2-ethylhexyl mercaptan. 36 g. (0.36 mole) of phosgene was then added over an interval of 1 hr. 22 min., maintaining the temperature at 50–55° C. The mixture was then allowed to stir for 4 hrs. 6 min. at 24–60° C. It was then worked up in the same manner as in Example 7. There was obtained 39.5 g. (63.1% yield) of 2-ethylhexyl chlorothiolformate, B.P. (10 mm.) 112.5–113.5° C., $n_D^{30}$ 1.4750.

*Analysis.*—Calcd. for $C_9H_{17}ClOS$: Cl, 16.98; S, 15.36. Found: Cl, 16.86; S, 15.36.

*Example 31.—t-Butyl Chlorothiolformate*

A 4 neck, 1 liter flask was provided with a stirrer, thermometer, gas inlet tube and refrigerated condenser and maintained at −25° to −30° C. during the entire course of the reaction. A quantity of 20 g. of pulverized activated carbon and 180 g. (2.00 moles) of tertiary butyl mercaptan was then charged to the flask. 220 g. (2.20 moles) of phosgene was then added over an interval of 22 minutes at a temperature range of 21.5 to 39.0° C. The mixture was then allowed to stir at 19.5° C. to 24.0° C. for 20.5 hours. The excess phosgene was then removed by stripping with air. The mixture was then filtered with Dicalite Filter Aid. The filter cake was washed with a 125 cc. portion of n-pentane and the combined filtrate was transferred to a 500 cc. still pot and the volatiles were removed by distilling through a fractional distillation column under reduced pressure while not allowing the distilland in the still pot to rise above 60° C. There was obtained as a residue 197 g. (64.6% yield) of tertiary butyl chlorothiolformate, $n_D^{30}$ 1.4694.

*Analysis.*—Calcd. for $C_5H_9ClOS$: Cl, 23.23; S, 21.01. Found: Cl, 22.96; S, 20.78.

Various of the compounds are effective as fumigants against *A. niger*, nematodes, *F. solani*, and *R. solani*, as mildew eradicants, as herbicides against squash and soybeans, as agents for the control of rust, as pesticides against mites and houseflies. Where the compounds exhibit relatively low activity against various pests, bacteria and plants they may be reacted with various amines to form thiolcarbamates which are useful as pre-emergence herbicides.

Further details regarding the use of these compounds are set forth below.

(1) Methyl chlorothiolformate:
  Fumigant control of *A. niger*, 100%.
  Nematodes (110 p.p.m.), 100% control, no phytotoxicity.
  *F. solani* (55 p.p.m.), 100% control, no phytotoxicity.
  *R. solani* (55 p.p.m.), 75% control, no phytotoxicity.
(2) Ethyl chlorothiolformate:
  Fumigant control of *A. niger*, 95%.
  Nematodes (110 p.p.m.), 100% control, no phytotoxicity.
  *F. solani* (110 p.p.m.), 75% control, no phytotoxicity.
(3) n-Propyl chlorothiolformate:
  Nematodes (110 p.p.m.), 100% control, no phytotoxicity.
  *F. solani*, 75% control, no phytotoxicity.
(4) i-Propyl chlorothiolformate: When this compound is reacted with di-n-propylamine it forms isopropyl di-n-propylthiolcarbamate which is a pre-emergence herbicide that prevents the germination of oat seeds at 20 lb./acre in a can test.
(5) n-Butyl chlorothiolformate:
  Fumigant control of *A. niger*, 90%.
  Nematodes (110 p.p.m.), 100% control, no phytotoxicity.
  *F. solani* (27 p.p.m.), 100% control, no phytotoxicity.
(6) Sec-butyl chlorothiolformate: When this compound is reacted with di-n-propylamine it forms sec-butyl di-n-propylthiocarbamate which is a pre-emergence herbicide that completely controls the germination of oat and rye seeds at 2½ lb./acre in a flat test.
(7) i-Butyl chlorothiolformate: *F. solani* (27 p.p.m.), 100% control, no phytotoxicity.
(8) n-Amyl chlorothiolformate:
  Fumigant control of *A. niger*, 100%.
  Nematodes (110 p.p.m.), 100% control, no phytoxicity.
  *F. solani* (27 p.p.m.), 100% control, no phytotoxicity.
(9) n-Hexyl chlorothiolformate:
  Fumigant control of *A. niger*, 100%.
  *F. solani* (110 p.p.m.), 100% control, no phytotoxicity.
(10) n-Heptyl chlorothiolformate:
  Fumigant control of *A. niger*, 100%.

F. solani (110 p.p.m), 100% control, no phytotoxicity.
(11) n-Octyl chlorothiolformate:
Fumigant control of A. niger, 100%.
F. solani (110 p.p.m.), 100% control, no phytotoxicity.
(12) n-Decyl chlorothiolformate:
Completely kills squash and soy beans when sprayed on the young seedlings at 0.2% concn.
50–75% control of mildew at 1000 p.p.m.
(13) n-Dodecyl chlorothiolformate:
Completely kills squash when sprayed on the young seedlings at 0.2% concn. and severely injures soybeans.
75–100% control of mildew at 500 p.p.m.
(14) n-Tetradecyl chlorothiolformate:
Mites, post embryonic 0.12%, 100% control. Completely kills squash when sprayed on young seedlings at 0.2% concn.
75–100% control of rust and mildew at 1000 p.p.m.
(15) Phenyl chlorothiolformate: When reacted with dimethylamine it forms phenyl dimethylthiolcarbamate which completely prevents germination of rye at 10 lb./acre.
(16) o-Tolyl chlorothiolformate:
Fumigant control of A. niger, 100%.
F. solani (27 p.p.m.), 100% control, no phytotoxicity.
Kills squash seedlings at 0.2% concn.
(17) m-Tolyl chlorothiolformate:
Fumigant control of A. niger, 100%.
F. solani (27 p.p.m.), 100% control, no phytotoxicity.
(18) p-Tolyl chlorothiolformate:
Fumigant control of A. niger, 100%.
F. solani (27 p.p.m.), 100% control, no phytotoxicity.
R. solani (27 p.p.m.), 75% control, no phytotoxicity.
Kills soybean seedlings at 0.2% concn.
(19) p-Chlorophenyl chlorothiolformate:
Fumigant control of A. niger, 100%.
F. solani (27 p.p.m.), 100% control, no phytotoxicity.
100% kill of M. domestica insect at 0.5% concn.
(20) 2-naphthyl chlorothiolformate:
F. solani (110 p.p.m.), 100% control, no phytotoxicity.
Kills soybean seedlings at 0.2% concn.
(21) Benzyl chlorothiolformate:
F. solani (27 p.p.m.), 100% control, no phytotoxicity.
100% kill of M. domestica insect at 0.5% concn.
75–100% control of nematodes at 110 p.p.m.
75% control of R. solani at 110 p.p.m.
(22) p-Chlorobenzyl chlorothiolformate:
100% kill of M. domestica insect at 0.5% concn.
F. solani (55 p.p.m.), 100% control, no phytotoxicity.
R. solani (110 p.p.m.), 75% control, no phytotoxicity.
(23) 2-phenylethyl chlorothiolformate: F. solani (110 p.p.m.), 100% control, no phytotoxicity.
(24) Cyclohexyl chlorothiolformate: When this compound is reacted with di-n-propylamine it forms cyclohexyl di-n-propylthiolcarbamate which is a pre-emergence herbicide that has the following effect on rye grass seeds:

| Rate/acre | Percent Ge | Growth |
| --- | --- | --- |
| 40 lb | 20 | 0+ |
| 10 lb | 60 | 0+ |

(25) Trimethylene bis(chlorothiolformate):
Fumigant control of A. niger, 100%.
100% kill of M. domestica insect at 0.5% concn.
Nematodes (110 p.p.m.), 100% control, no phytotoxicity.
F. solani (110 p.p.m.), 100% control, no phytotoxicity.
(26) Tetramethylene bis(chlorothiolformate):
Fumigant control of A. niger, 100%.
100% kill of M. domestica insect at 0.5% concn.
Nematodes (110 p.p.m.), 100% control, no phytotoxicity.
F. solani (110 p.p.m.), 100% control, no phytotoxicity.
(27) Pentamethylene bis(chlorothiolformate):
100% kill of M. domestica insect at 0.5% concn.
F. solani (110 p.p.m.), 100% control, no phytotoxicity.
100% post embryonic control of mites at 0.12%.
Kills squash seedlings at 0.2% concn.
(28) Allyl chlorothiolformate:
Nematodes (110 p.p.m.), 100% control, no phytotoxicity.
F. solani (27 p.p.m.), 100% control, no phytotoxicity.
(29) Carboethoxymethyl chlorothiolformate:
Fumigant control of A. niger, 100%.
F. solani (27 p.p.m.), 100% control, no phytotoxicity.
R. solani (110 p.p.m.), 75% control, no phytotoxicity.
(30) 2-ethylhexyl chlorothiolformate: Fumigant control of A. niger, 100%.
(31) t-Butyl-chlorothiolformate: When reacted with di-n-propylamine this compound yields S-tert.-butyl-di-n-propylthiolcarbamate which when applied at the rate of 5 lbs./acre prevents germination and growth of nut grass and oats. At this rate, it also kills foxtail and is almost completely effective for the prevention of germination thereof.

Tests of the compounds, as outlined above, indicate that they are most useful in the control of nematodes and fungi. The compounds may be formulated with any suitable common solvent such as diesel oil or paint thinner. In use, they should be diluted to an extent which enables them to be applied uniformly by means of available farm equipment. The compounds may also be formulated as emulsible concentrates as by the use of such emulsifiers as the polyoxyalkylene derivatives of hexitol anhydride partial long chain fatty acid esters which enables them to be dispersed in water and applied as dilute aqueous emulsions. An effective dosage varies between 13 p.p.m. and 110 p.p.m. of soil when used against nematodes and fungi.

A method for reacting these compounds with amines to form thiolcarbamates is as follows:

One mole of the chlorothiolformate is added gradually with cooling (e.g., in an ice bath) to 2.1 moles of the appropriate amine in an ether solvent. The mixture is allowed to stand for five minutes and the precipitated amine hydrochloride is removed by washing with water. The ether solution is then washed with dilute hydrochloric acid (e.g., 5 M), to remove any unreacted amine and this is followed by washing with several portions of water. The ether solution is dried over $MgSO_4$, filtered and the ether evaporated off on a steam bath. The product may be distilled for purification purposes, if desired.

Obviously, many modifications and variations of the invention as hereinbefore set forth may be made without departing from the spirit and scope thereof, and therefore only such limitations should be imposed as are indicated in the appending claims.

I claim:
1. A method for preparing chlorothiolformates comprising: reacting a compound selected from the class consisting of alkyl mercaptans having less than 15 carbon atoms, lower cycloalkyl mercaptans, lower alkenyl mercaptans, phenyl mercaptans, lower alkyl-substituted phenyl mercaptans, chloro-substituted phenyl mercaptans, benzyl mercaptans, chlorobenzyl mercaptans, carbo-lower-alkoxy-lower alkyl mercaptans, naphthyl mercaptans, and polymethylene dithiols having no more than five carbon atoms with phosgene in the presence of finely divided activated carbon as a catalyst.

2. The method of claim 1 wherein the said compound is methyl mercaptan.

3. The method of claim 1 wherein the said compound is ethyl mercaptan.

4. The method of claim 1 wherein the said compound is propyl mercaptan.

5. The method of claim 1 wherein the said compound is butyl mercaptan.

6. The method of claim 1 wherein the said compound is ethyl mercaptoacetate.

7. The method of claim 1 wherein the said compound is toluenethiol.

8. The method of claim 1 wherein the said compound is benzyl mercaptan.

9. Compounds of the general formula

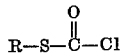

where R is selected from the class consisting of chlorobenzyl, carbo-lower-alkoxy-lower-alkyl, and

wherein R' is a polymethylene group having no more than five carbon atoms.

10. The compound p-chlorobenzyl chlorothiolformate.

11. The compound trimethylene bis(chlorothiolformate).

12. The compound pentamethylene bis(chlorothiolformate).

13. The compound carboethoxymethyl chlorothiolformate.

References Cited in the file of this patent
UNITED STATES PATENTS

| | | |
|---|---|---|
| 2,850,518 | Gaertner et al. | Sept. 2, 1958 |
| 2,901,499 | Tilles et al. | Aug. 25, 1959 |
| 2,906,662 | Carlson | Sept. 29, 1959 |
| 2,934,533 | Schuler et al. | Apr. 26, 1960 |
| 2,947,660 | Hoffman | Aug. 2, 1960 |

OTHER REFERENCES

Berkman et al.: "Catalysis," page 487 (1940).

Mantell: "Industrial Carbon," 2nd Ed. (1946), page 139.

Riemschneider et al.: Monatsh. Chem., vol. 84, pp. 518–21 (1953).